Figure 1:
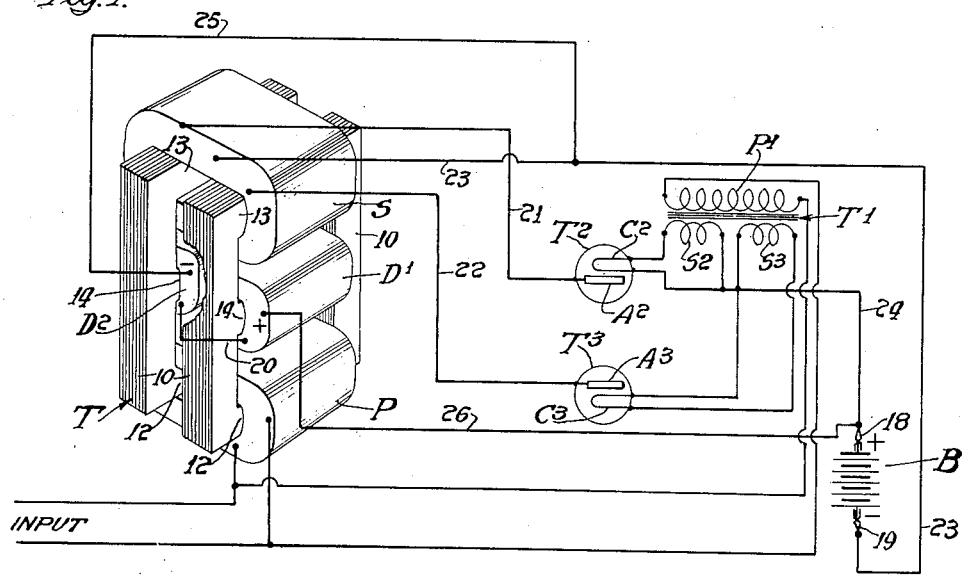

March 18, 1941.　　　M. L. PUGH　　　2,235,330

BATTERY CHARGER

Filed Dec. 6, 1939

Inventor:
Merlin L. Pugh,
By: Bair & Freeman
Attorneys

Witness:
E. Camporini

Patented Mar. 18, 1941

2,235,330

UNITED STATES PATENT OFFICE 2,235,330

BATTERY CHARGER

Merlin L. Pugh, Minneapolis, Minn.

Application December 6, 1939, Serial No. 307,842

3 Claims. (Cl. 171—314)

My invention relates to a transformer and rectifier system for charging storage batteries.

One object of the invention is to provide a battery charger which is entirely automatic with respect to maintaining a predetermined charging rate for a number of batteries that are connected in series in the charging circuit, the structure being comparatively simple and inexpensive to manufacture and so designed and arranged that any number of batteries up to the capacity of the transformer can be charged at the predetermined charging rate without adjustment of any controls whatsoever.

A further object is to provide a battery charger in which it is merely necessary to connect the batteries to be charged in series and then connect the end cells with the direct current clips of the charger, without any mechanical adjustments being necessary, either manually, electrically or otherwise.

Another object is to provide a battery charger which operates so as to extend the life of the rectifier bulb to its maximum, this being accomplished by an automatic regulation feature which prevents charging at more than a predetermined rate, regardless of the number of batteries placed in the charging circuit and without regard to the condition of any of the cells either at the time of connecting them in the charging circuit or subsequently when their condition might change radically as a result of pasage of charging current therethrough for a period of time.

Still another object is to provide a battery charger wherein rectifier tube failures are minimized and likewise the attention of the operator to the charger is minimized, it being merely necessary to hook up the batteries or remove them as desired, without thought as to readjustment of the charging rate to accommodate varying numbers of batteries.

More particularly, it is an object of this invention to provide an automatic battery charger wherein a transformer, either of the autotransformer type or of the insulated transformer type, includes a pair of direct current coil legs on which direct current coils are wound and series connected in opposition to each other, these coils being connected across the battery being charged so as to be energized thereby in proportion to the number of batteries and the direct current coils so affecting the flow of magnetic flux through the core of the transformer that the output of the transformer to the rectifier for the battery is automatically regulated when a battery of any size within the capacity of the transformer is placed on the charging circuit.

With these and other objects in view, my invention with respect to its features which I believe to be novel and patentable will be pointed out in the claims appended hereto. For a better detailed understanding of the invention, and further objects relating to details of economy of my invention, reference is made to the following description and to the accompanying drawing wherein such further objects will definitely appear, and in which Figure 1 is an electrodiagrammatic view of an insulated transformer type of battery charger embodying my invention, and Figure 2 is a similar electrodiagrammatic view of an autotransformer type of the charger.

Figure 2:
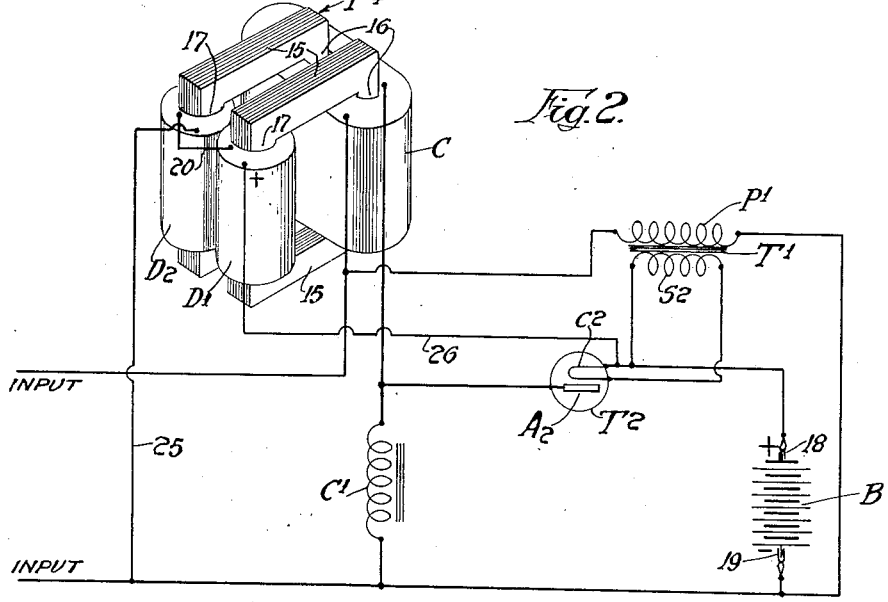

On the accompanying drawing, I have used the reference character T to indicate generally an insulated type of transformer of Figure 1. The transformer T includes a core having end legs 10 connected by primary, secondary and direct current coil legs 12, 13 and 14, respectively. The legs 12 and 13 may be arranged double, as illustrated, or in a variety of other arrangements, but as to the legs 14, two of necessity are provided. On the legs 14 are direct current coils $D^1$ and $D^2$. The coils $D^1$ and $D^2$ are connected in series, the connection between them being shown at 20.

On the primary legs 12 of the transformer T, a primary coil P is wound. On the secondary legs 13, a secondary coil S is wound. An alternating input current is supplied to the coil P and indicated "Input" on the drawing. The input current also flows to a primary coil $P^1$ of a rectifier transformer $T^1$.

The transformer $T^1$ has secondary coils $S^2$ and $S^3$ for supplying current to the filaments or cathodes $C^2$ and $C^3$ of a pair of thermionic half wave rectifier tubes $T^2$ and $T^3$. The plates or anodes $A^2$ and $A^3$ of the tubes $T^2$ and $T^3$ are connected by wires 21 and 22 to the ends of the secondary coil S of the transformer T. The secondary coil S has a center tap to which a wire 23 is connected and extends to a battery clip 19. The clip 19 is adapted to connect with the negative lead of the battery B, while a battery clip 18 is adapted to connect with the positive terminal thereof. Current is supplied to the clip 18 through a wire 24 connected with the cathodes $C^2$ and $C^3$ whereby rectified current is supplied by the coil S to the battery B for charging it.

With the exception of the direct current coils $D^1$ and $D^2$, I have thus far described a transformer-rectifier type of battery charger without regard to any regulation of the value of the rectified current supplied to the battery. The direct current coils $D^1$ and $D^2$ are provided to accomplish automatic regulation in this connection. For this purpose a pair of wires 25 and 26 connect the wires 23 and 24 with the direct current coils. In other words, the direct current coils are shunted across the battery B.

In Figure 2, I show an autotransformer type of battery charger in which the transformer is indicated generally at $T^4$. It has a core consisting of end legs 15 and connecting legs 16 and 17. The connecting legs 16 pass through a coil C which is connected in series with a choke coil $C^1$ across the input leads. Shunting the choke coil $C^1$ is a half wave rectifier tube $T^2$ and the battery B to be charged. Across the input wires, I again provide a primary $P^1$ of a transformer $T^1$, the secondary $S^2$ of which is provided for furnishing current to the filament $C^2$ of the rectifier tube $T^2$. Obviously, the arrangement in Figure 2 can be elaborated upon and another half wave rectifier tube, as in Figure 1, or a single full wave rectifier tube used to supply fully rectified current to the battery B. In such case, the choke coil $C^1$ is omitted.

As in Figure 1, direct current coils $D^1$ and $D^2$ are provided for the transformer $T^4$. They are mounted on the legs 17 connected in series by a wire 20 and connected across negative and positive leads of the battery B by wires 25 and 26, respectively.

Practical operation

In the construction of the battery charger as shown in Figure 1, the connection of the direct current coils $D^1$ and $D^2$ in series and in opposition causes the resultant of the alternating current voltage built up in each coil to buck each other and the current at the leads 25 and 26 is therefore zero. Connecting these leads across the battery B results in the current from the battery energizing the coils $D^1$ and $D^2$ in proportion to the strength of the battery or the number of cells connected between the battery clips 18 and 19.

The direct current in the coils $D^1$ and $D^2$ causes a direct current magnetic flux in the legs 14 of the transformer T. This reduces the number of alternating current flux lines in the legs 14 and forces them to flow through the leg 13, thereby increasing the secondary current from the coil S. This current from the coil S is increased in proportion to the increase of current in the coils $D^1$ and $D^2$. It is therefore obvious that the current output of the coil S is increased by additional batteries between the clips 18 and 19 and decreased by removal of batteries therefrom. As a result, regardless of the number of batteries, the charging rate will remain constant.

Likewise, in Figure 2, the number of batteries on charge regulates the amount of direct current flowing in the coils $D^1$ and $D^2$, which in turn regulates the amount of alternating current magnetic flux possible of passage through the core of the transformer. The result is an automatic regulation of the reactance of the transformer, with the addition or removal of batteries carrying the reactance to such an extent that the charging rate remains constant. A choke coil $C^1$ or resistance from the anode $A^2$ of the tube $T^2$ to the negative lead of the battery B is necessary where a half wave tube is used. This results in an increase in the reactance of the transformer, since without a choke coil or resistance, current would flow only during one-half the cycle. During the remaining half cycle, the magnetic lines created in the core of the transformer $T^4$ by the alternating current during its previous half cycle do not have time to collapse completely, and thus give the effect of less material in the transformer core. To aid in the collapse of the magnetic lines, a small current is allowed to travel through the coil C in the reverse direction (such current being that admitted by the choke coil $C^1$), which creates an alternating current magnetic flux in the reverse direction, thereby demagnetizing the coil and giving the transformer the benefit of its full reactance.

In both the construction of Figure 1 and the construction of Figure 2, the use of the coils $D^1$ and $D^2$ in opposition to each other and shunted across the battery being charged so as to receive current therefrom in proportion to the size or number of cells in the battery, accomplishes the desired automatic regulation without the necessity of manually controlling the charging rate by a resistance or the like. My charger entirely eliminates the necessity of any manual control or of any manual operation other than the required connecting and disconnecting, respectively, of batteries to be charged and those that are fully charged.

In accordance with the provisions of the patent statutes, I have described the principle of operation of my invention together with illustrations of battery chargers which I consider to represent the best embodiments thereof, but I desire to have it understood that the structures disclosed are only illustrative and that the invention may be carried out by other means within the scope of the appended claims.

What I claim as new and desire to secure by Letters Patent of the United States is:

1. In a battery charger, a transformer having a pair of core members, each provided with a primary coil leg, a secondary coil leg, direct current coil leg, and connecting legs whereby magnetic flux through said direct current coil leg of each core member must follow a path through said primary and secondary coil legs thereof, said core members having their adjacent faces spaced from each other, a primary coil on each of said primary coil legs and connected with a source of alternating input current, a secondary coil on said pair of secondary coil legs, a rectifier having its alternating current input side connected with said secondary coil and its direct current output side connected with a battery to be charged thereby, a pair of direct current coils, one on each of said direct current coil legs, said direct current coils being connected in series and in opposition with relation to each other, and means for automatically regulating the output from said secondary coil to said rectifier comprising direct shunt connections between the terminals of said battery and said direct current coils to supply the coils with current from the battery in proportion to the size of the battery.

2. In a battery charger, a coil and core system having a pair of similar magnetic core members forming two individual magnetic circuits, an alternating current coil surrounding similar portions of said core members, rectifier means including a half wave rectifier, means for supplying alternating current power through said coil to the input side of said rectifier means, a battery to be charged connected in circuit with said rectifier means, said core members each including a leg, said legs being similarly arranged, a direct current coil on each of said legs whereby the magnetic flux traversing said direct current coils also traverses said alternating current coil, said direct current coils being serially connected and wound to oppose each other, and means for regulating the direct current output of said rectifier means comprising electrical connections for connecting said serially connected direct current coils across the terminals of said battery.

3. In a battery charger, a coil and core system having a pair of similar magnetic core members each forming an individual magnetic circuit, an alternating current coil surrounding a similar portion of each core member, a half wave rectifier, means for supplying alternating current through said coil to the alternating current input side of said rectifier, a battery to be charged connected with the output side of said rectifier, a pair of direct current coils on similarly arranged portions of said core members whereby the magnetic flux traversing said direct current coils also traverses said alternating current coil, said direct current coils being connected in series and wound to oppose each other, means for regulating the direct current output from said rectifier comprising direct electrical connections shunt connecting said direct current coils with the terminals of said battery, and a choke coil shunted across said rectifier and battery to stabilize the charging rate throughout the range of batteries being charged.

MERLIN L. PUGH.